United States Patent
Du et al.

(10) Patent No.: US 11,844,310 B2
(45) Date of Patent: Dec. 19, 2023

(54) SYSTEM AND METHOD FOR CONTROLLING REEL OF COMBINE HARVESTER

(71) Applicant: SHANDONG UNIVERSITY OF TECHNOLOGY, Shandong (CN)

(72) Inventors: Juan Du, Shandong (CN); Xiang Yin, Shandong (CN); Jiahao An, Shandong (CN); Chengqian Jin, Shandong (CN); Duanyang Geng, Shandong (CN); Junke Zhu, Shandong (CN)

(73) Assignee: SHANDONG UNIVERSITY OF TECHNOLOGY, Shandong (CN)

( * ) Notice: Subject to any disclaimer, the term of this patent is extended or adjusted under 35 U.S.C. 154(b) by 752 days.

(21) Appl. No.: 17/035,310

(22) Filed: Sep. 28, 2020

(65) Prior Publication Data
US 2022/0000023 A1 Jan. 6, 2022

(30) Foreign Application Priority Data
Jul. 6, 2020 (CN) .......................... 202010639357.X

(51) Int. Cl.
- A01D 41/12 (2006.01)
- A01D 57/12 (2006.01)
- A01D 69/02 (2006.01)
- G01S 19/52 (2010.01)
- A01D 41/127 (2006.01)

(52) U.S. Cl.
CPC .......... *A01D 41/127* (2013.01); *A01D 57/12* (2013.01); *A01D 69/02* (2013.01); *G01S 19/52* (2013.01)

(58) Field of Classification Search
CPC ...... A01D 41/127; A01D 57/12; A01D 69/02; G01S 19/52
See application file for complete search history.

(56) References Cited

U.S. PATENT DOCUMENTS

| | | | | |
|---|---|---|---|---|
| 6,073,070 A | * | 6/2000 | Diekhans | A01B 79/005 701/1 |
| 6,119,442 A | * | 9/2000 | Hale | A01D 41/127 56/10.2 H |
| 2019/0021226 A1 | * | 1/2019 | Dima | A01D 34/008 |
| 2023/0292665 A1 | * | 9/2023 | Vandike | G05D 1/0219 56/10.2 A |

FOREIGN PATENT DOCUMENTS

| | | | |
|---|---|---|---|
| CN | 107306584 A | | 11/2017 |
| CN | 108934416 A | | 12/2018 |
| CN | 109937685 A | * | 6/2019 |

* cited by examiner

*Primary Examiner* — Abigail A Risic
(74) *Attorney, Agent, or Firm* — MH2 TECHNOLOGY LAW GROUP, LLP

(57) ABSTRACT

A system and a method for controlling a reel of a combine harvester, wherein, the system comprises a satellite positioning receiver, a driving device, a controller and a rotating speed sensor; the rotating speed sensor collects and transmits an actual rotating speed of the reel to the controller, and the controller provides the driving device with a speed regulation signal according to the actual rotating speed and the operation running speed. The rotating speed of the reel can be automatically, accurately and quickly adjusted according to the operation running speed of the combine harvester during the operation of the combine harvester, and improve the operation efficiency and quality while ensuring the crop feed quantity.

18 Claims, 2 Drawing Sheets

SYSTEM AND METHOD FOR CONTROLLING REEL OF COMBINE HARVESTER

CROSS-REFERENCE TO RELATED APPLICATION

This application claims the priority of Chinese Patent Application No. 202010639357.X, entitled "System and Method for Controlling Reel of Combine Harvester" filed with the China National Intellectual Property Administration on Jul. 6, 2020, which is incorporated herein by reference in its entirety.

TECHNICAL FIELD

The disclosure relates to the technical field of agricultural production, in particular to a system and a method for controlling a reel of a combine harvester.

BACKGROUND

The reel is a key component of a header of the harvester, which is located in the front end of the combine harvester. The reel plays a role in supporting and guiding crops during an operation of the combine harvester. If the wheel speed of the reel is too fast, grains will be knocked out so that grain losses will be increased. If the wheel speed of the reel is too slow, the crop can not be directed to the header effectively so that the feed quantity and the cutting effect of a cutting knife are affected. Under different running speeds, a speed regulation of the reel is required in order to ensure a reasonable crop feed quantity. The traditional speed regulation of the reel mostly adjusts the speed of the reel by changing a transmission ratio between a driven wheel of the reel and an upper-stage transmission in a mechanical principle. However, this transmission connection type cannot adjust a rotating speed of the reel during an operation process, and cannot solve the problem that the rotating speed of the reel matches with the operating speed.

The Chinese patent No. 201710439736.2 discloses that a torque sensor is installed on a gap bridge of a harvester, and a control mode of adjusting the operating speed by connecting a driving axle with a road wheel is adopted to adjust the crop feed quantity, so as to improve the harvesting quality. The Chinese patent No. 201810739198.3 uses a BP neural network algorithm to collect six sensor parameters to adjust a concave screen clearance and a forward velocity, so as to achieve a stable operation of the harvester. The two disclosures both adopt the operating speed as a control object which relates to a hydraulic pump and a variable hydraulic motor, have a more complex modification and no universality. Meanwhile, the two disclosures do not relate to the measurement and control of the rotating speed of the reel, have problems of a crop feed delay, high energy consumption, etc., and have a higher header loss.

SUMMARY

The present disclosure provides a system and a method for controlling a reel of a combine harvester to address the defects in the prior art. The disclosure can change a rotating speed of the reel in real time according to an operation running speed of the harvester, thereby adjusting a feed quantity. The system of the disclosure can be installed easily on various combine harvesters, with a high applicability a quick and efficient adjustment, and an effective reduction of the header loss.

In order to achieve the above effects, the disclosure provides the following solution.

A system for controlling a reel of a combine harvester comprises a satellite positioning receiver, a driving device, a controller and a rotating speed sensor;

wherein, the controller is respectively connected with the satellite positioning receiver, the driving device and the rotating speed sensor;

the driving device is connected with a main shaft of the reel to provide the reel with a rotating torque;

the satellite positioning receiver is configured to calculate an operation running speed of the combine harvester and transmit the operation running speed to the controller;

the rotating speed sensor collects and transmits an actual rotating speed of the reel to the controller, and the controller provides the driving device with a speed regulation signal according to the actual rotating speed and the operation running speed to drive the reel to rotate, so as to adjust a crop feed quantity.

Optionally, the satellite positioning receiver specifically comprises a satellite antenna and a receiver;

wherein, the satellite antenna is arranged at a top of the combine harvester; and the receiver is arranged in a cab of the combine harvester.

Optionally, the driving device specifically comprises a direct current deceleration motor and a motor driver;

wherein, the direct current deceleration motor is connected with the main shaft of the reel; and the direct current deceleration motor is configured to provide the reel with the rotating torque; and the motor driver is connected with the controller to receive the speed regulation signal of the controller to drive the direct current deceleration motor.

Optionally, the system further comprises a signal processing circuit;

wherein, the signal processing circuit is respectively connected with the rotating speed sensor and the controller; and the signal processing circuit is configured to convert the actual rotating speed into a digital signal and transmit the digital signal into the controller.

Optionally, the system further comprises a touch screen; wherein, the touch screen is connected with the controller to transmit a control instruction to the controller; and the control instruction comprises a manual speed regulation mode and an automatic speed regulation mode.

Optionally, the touch screen and the controller are both installed in the cab of the combine harvester.

A method for controlling a reel of a combine harvester, the method comprises steps of:

acquiring a control instruction; wherein, the control instruction comprises a manual speed regulation mode and an automatic speed regulation mode;

under a condition that the control instruction is the manual speed regulation mode, manually setting a designated reel rotating speed value by a user, and controlling a driving device by a controller to drive a rotating speed of the reel to reach the designated reel rotating speed value;

under a condition that the control instruction is the automatic speed regulation mode, acquiring an operation running speed and an actual rotating speed;

providing the driving device with a speed regulation signal according to the operation running speed and the actual rotating speed to drive the reel to rotate, so as to adjust the crop feed quantity.

Optionally, the step of providing the driving device with the speed regulation signal according to the operation running speed and the actual rotating speed to drive the reel to rotate so as to adjust the crop feed quantity specifically comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

According to the detailed embodiments of the disclosure, the disclosure can achieve following technical effects:

The disclosure discloses a system and a method for controlling a reel of a combine harvester, the system comprises a satellite positioning receiver, a driving device, a controller and a rotating speed sensor; the rotating speed sensor collects and transmits an actual rotating speed of the reel to the controller, and the controller provides the driving device with a speed regulation signal according to the actual rotating speed and the operation running speed. The disclosure may realize that the rotating speed of the reel can be automatically adjusted according to the operation running speed of the combine harvester during the operation of the combine harvester. The system of the disclosure can be easily installed on various combine harvesters, with a high applicability, a quick and efficient adjustment, and an effective reduction of the header loss, thereby improving the operation efficiency and quality while ensuring the crop feed quantity.

BRIEF DESCRIPTION OF THE DRAWINGS

In order to more clearly explain the embodiments of the present disclosure or the technical solutions in the conventional technology, the drawings used in the embodiments will be briefly described below. Obviously, the drawings in the following description are only some embodiments of the present disclosure. For those skilled in the art, other drawings may be obtained based on the drawings without creative efforts.

DESCRIPTION OF THE REFERENCE NUMERALS

101 satellite positioning receiver, 102 touch screen, 103 controller, 104 motor driver, 105 direct current deceleration motor, 106 reel, 107 signal processing circuit, 108 rotating speed sensor.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without any creative efforts shall fall within the scope of the present disclosure.

The disclosure intends to provide a method and a system for controlling a reel of a combine harvester, to solve the defect of a crop feed delay.

For a better understanding of above intention, features and advantages of the present disclosure, the disclosure will be described in details by reference to the accompanying drawings and specific embodiments thereof.

Figure 1:
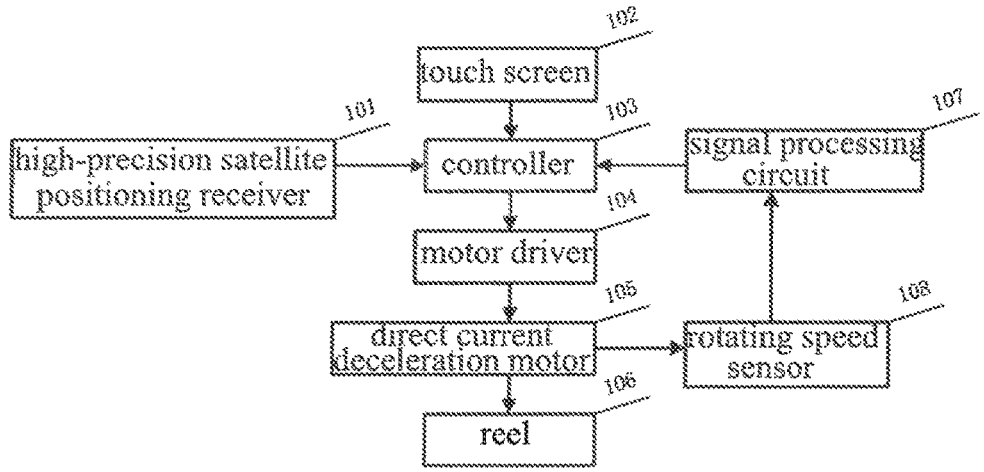
FIG. 1 is a schematic view of a system for controlling a reel of a combine harvester according to the present disclosure.

FIG. 1 is a schematic view of a system for controlling a reel of a combine harvester according to the present disclosure. As shown in FIG. 1, the system for controlling the reel of the combine harvester comprises a satellite positioning receiver 101, a driving device, a controller 103 and a rotating speed sensor 108.

The controller 103 is respectively connected with the satellite positioning receiver 101, the driving device and the rotating speed sensor 108.

The driving device is connected with a main shaft of the reel 106 to provide the reel 106 with a rotating torque.

The satellite positioning receiver 101 is configured to calculate and transmit an operation running speed of the combine harvester to the controller 103; and the satellite positioning receiver 101 specifically comprises a satellite antenna and a receiver.

The satellite antenna is arranged at the top of the combine harvester; and the receiver is arranged in the cab of the combine harvester. In practical applications, the satellite antenna of the satellite positioning receiver 101 (also called high-precision satellite positioning receiver) is installed at the top of the combine harvester, and the receiver is installed in the cab of the combine harvester and configured to receive a positioning signal of the combine harvester, filter ground speed information, conver the ground speed information into the operation running speed by multiple amplification, and transmit the operation running speed to the controller in real time.

The rotating speed sensor 108 collects and transmits an actual rotating speed of the reel 106 to the controller 103, the controller 103 provides the driving device with a speed regulation signal according to the actual rotating speed and the operation running speed to drive the reel 106 to rotate, so as to adjust a crop feed quantity.

The driving device specifically comprises a direct current deceleration motor 105 and a motor driver 104.

The direct current deceleration motor 105 is connected with the main shaft of the reel 106 to provide the reel 106 with the rotating torque;

The motor driver 104 is connected with the controller 103, to receive the speed regulation signal of the controller 103 to drive the direct current deceleration motor 105.

The signal processing circuit 107 is respectively connected with the rotating speed sensor 108 and the controller 103 and is configured to convert the actual rotating speed into a digital signal and transmit the digital signal into the controller 103.

The touch screen 102 is connected with the controller 103 to transmit a control instruction to the controller 103; and the control instruction comprises a manual speed regulation mode and an automatic speed regulation mode. In practical applications, the touch screen 102 and the controller 103 are both installed in the cab of the combine harvester. The system for controlling the reel of the combine harvester can switch between the manual speed regulation mode and the automatic speed regulation mode. After the system is started, a working mode can be switched by a user operating the touch screen 102. Under the manual speed regulation mode, the rotating speed of the reel 106 can be manually set; and under the automatic speed regulation mode, the rotating speed of the reel 106 can be adjusted by the controller 103 according to the operation running speed of the harvester.

Figure 2:
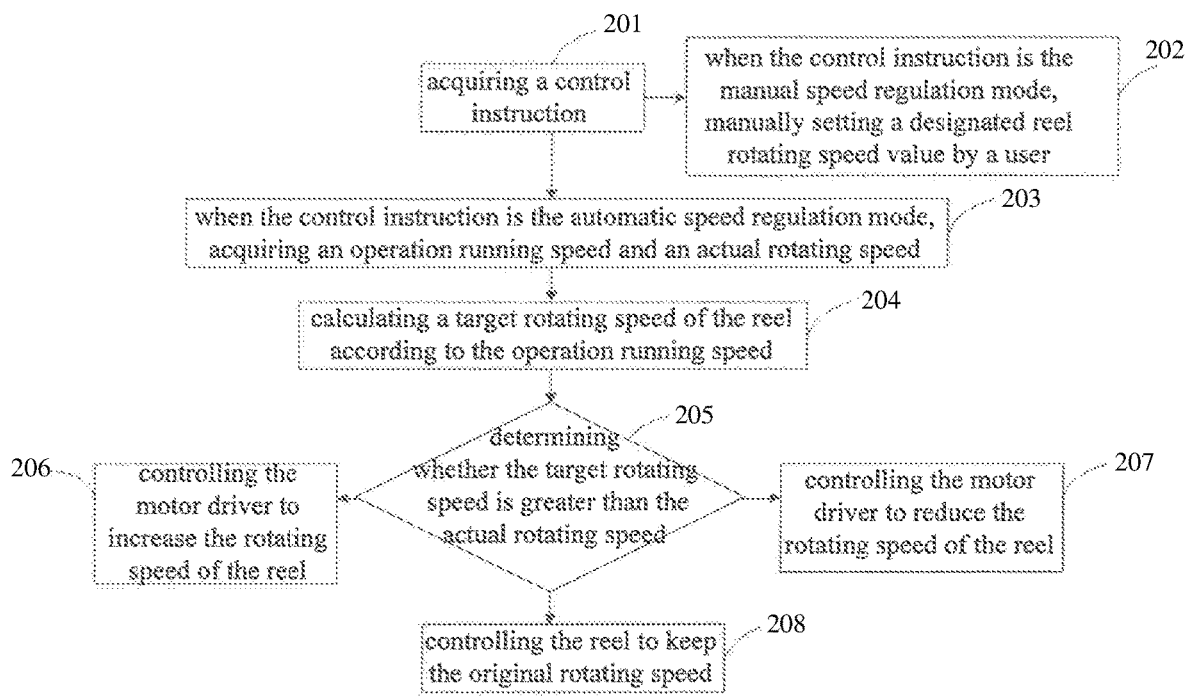
FIG. 2 is a schematic flowchart of a method for controlling a reel of a combine harvester according to the present disclosure.
Figure 3:
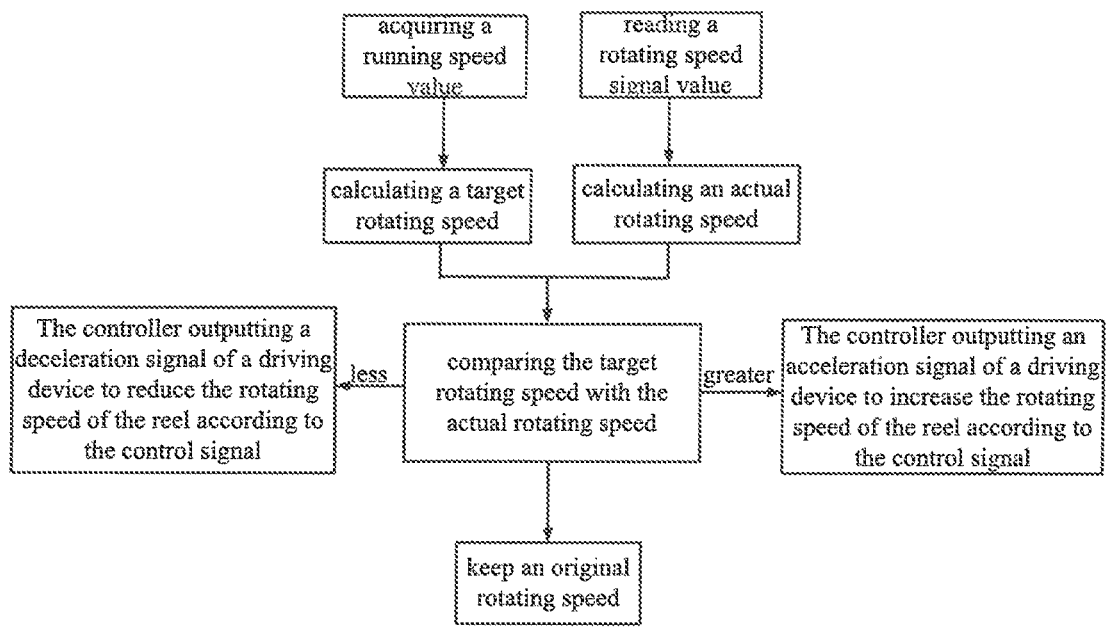
FIG. 3 is a schematic diagram of the principle of the method for controlling the reel of the combine harvester according to the present disclosure.

FIG. 2 is a schematic flowchart of a method for controlling a reel of a combine harvester according to the present disclosure. FIG. 3 is a schematic diagram of the principle of a method for controlling a reel of a combine harvester according to the present disclosure. As shown in FIGS. 2 and 3, the method for controlling the reel of the combine harvester comprises steps of:

step 201: acquiring a control instruction comprising a manual speed regulation mode and an automatic speed regulation mode;

step 202: under a condition that the control instruction is the manual speed regulation mode, manually setting a designated reel rotating speed value by a user, and controlling the motor driver by a controller to drive a rotating speed of the reel to reach the designated reel rotating speed value.

step 203: under a condition that the control instruction is the automatic speed regulation mode, acquiring an operation running speed and an actual rotating speed. In practical applications, a satellite positioning receiver receives a positioning signal of the combine harvester, resolves the operation running speed of the harvester, and transmits the operation running speed to the controller. Rotating speed signal value of a direct current deceleration motor can be read and transmitted to the controller by a rotating speed sensor. The actual rotating speed of the reel can be calculated by the controller according to the number of pulses of the rotating speed sensor with a specific computational process as follows: the ratio of the number of pulses of the rotating speed sensor received by the controller in a unit time to a resolution of the rotating speed sensor is the actual rotating speed of the reel.

The motor driver is provided with a speed regulation signal according to the operation running speed and the actual rotating speed to drive the reel to rotate, so as to adjust the crop feed quantity. Further, the step of providing the motor driver with the speed regulation signal according to the operation running speed and the actual rotating speed specifically comprises:

Step 204: calculating a target rotating speed of the reel according to the operation running speed. In practical applications, the target rotating speed of the reel can be calculated by the controller according to the operation running speed with the specific computational process as follows: a product of the operation running speed value of the combine harvester and a reel speed ratio $\lambda$ is the target rotating speed of the reel.

Step 205: determining whether the target rotating speed is greater than the actual rotating speed to generate a first determination result.

Step 206: under a condition that the first determination result is that the target rotating speed is greater than the actual rotating speed, controlling the motor driver to increase the rotating speed of the reel.

Step 207: under a condition that the first determination result is that the target rotating speed is less than the actual rotating speed, controlling the motor driver to reduce the rotating speed of the reel.

Step 208: under a condition that the first determination result is that the target rotating speed is equal to the actual rotating speed, controlling the reel to keep the original rotating speed.

The disclosure discloses a system and a method for controlling a reel of a combine harvester. When the harvester is operating, the user enters a mode switching interface by clicking the touch screen 102 in the cab. When the manual speed regulation mode is selected, the automatic speed regulation function of the system is shut, the target rotating speed is input by the user through a manual speed regulation interface, and the reel 106 rotates at a constant speed to enter the manual speed regulation mode. When the automatic speed regulation mode is selected, the satellite positioning receiver 101 transmits the operation running speed to the controller 103, meanwhile, the rotating speed sensor 108 transmits the rotating speed information of the reel into the controller 103 through the signal processing circuit 107, the controller 103 transmits acceleration and deceleration signals to the motor driver 104 through processing and comparing the operation running speed and the rotating speed of the reel, and the motor driver 104 realizes the acceleration and deceleration adjustments of the reel through controlling the direct current deceleration motor, to achieve the automatic speed regulation of the reel. The disclosure may realize that the rotating speed of the reel can be automatically, accurately and quickly adjusted according to the operation running speed of the combine harvester during the operation of the combine harvester, and improve the operation efficiency and quality while ensuring the crop feed quantity.

Various embodiments of the description have been described in a progressive way, each of which emphasizes the difference from the others, and among which the same and similar parts can be referred to each other.

The principles and implementation of the present disclosure have been described herein with specific examples, and the above embodiments are described only for a better understanding of the methods and core concepts of the present disclosure; meanwhile, the detailed implementation and the application scope could be amended by those skilled in the art according to the teachings of this disclosure. In conclusion, the contents of the description should not be construed as limiting the disclosure.

What is claimed is:

1. A system for controlling a reel of a combine harvester, the system comprising:
   a satellite positioning receiver,
   a driving device,
   a controller, and
   a rotating speed sensor;
   wherein:

the controller is respectively connected with the satellite positioning receiver, the driving device and the rotating speed sensor;

the driving device is connected with a main shaft of the reel to provide the reel with a rotating torque;

the satellite positioning receiver is configured to calculate an operation running speed of the combine harvester and transmit the operation running speed to the controller;

the rotating speed sensor collects and transmits an actual rotating speed of the reel to the controller; and the controller provides the driving device with a speed regulation signal according to the actual rotating speed and the operation running speed to drive the reel to rotate, so as to adjust a crop feed quantity.

2. The system for controlling the reel of the combine harvester according to claim 1, wherein the satellite positioning receiver comprises a satellite antenna and a receiver;

wherein, the satellite antenna is arranged at a top of the combine harvester; and the receiver is arranged in a cab of the combine harvester.

3. The system for controlling the reel of the combine harvester according to claim 1, wherein:

the driving device comprises a direct current deceleration motor and a motor driver;

the direct current deceleration motor is connected with the main shaft of the reel;

the direct current deceleration motor is configured to provide the reel with the rotating torque; and the motor driver is connected with the controller to receive the speed regulation signal of the controller to drive the direct current deceleration motor.

4. The system for controlling the reel of the combine harvester according to claim 1, further comprising a signal processing circuit;

wherein, the signal processing circuit is respectively connected with the rotating speed sensor and the controller; and the signal processing circuit is configured to convert the actual rotating speed into a digital signal and transmit the digital signal into the controller.

5. The system for controlling the reel of the combine harvester according to claim 1, further comprising a touch screen; wherein, the touch screen is connected with the controller to transmit a control instruction to the controller; and the control instruction comprises a manual speed regulation mode and an automatic speed regulation mode.

6. The system for controlling the reel of the combine harvester according to claim 5, wherein the touch screen and the controller are both installed in a cab of the combine harvester.

7. A method for controlling a reel of a combine harvester, wherein the method is applied to a system for controlling a reel of a combine harvester, the system comprising:

a satellite positioning receiver, a driving device, a controller and a rotating speed sensor;

wherein:

the controller is respectively connected with the satellite positioning receiver, the driving device and the rotating speed sensor;

the driving device is connected with a main shaft of the reel to provide the reel with a rotating torque;

the satellite positioning receiver is configured to calculate an operation running speed of the combine harvester and transmit the operation running speed to the controller;

the rotating speed sensor collects and transmits an actual rotating speed of the reel to the controller; and the controller provides the driving device with a speed regulation signal according to the actual rotating speed and the operation running speed to drive the reel to rotate, so as to adjust a crop feed quantity;

the method comprising:

acquiring a control instruction, wherein, the control instruction comprises a manual speed regulation mode and an automatic speed regulation mode;

under a condition that the control instruction is the manual speed regulation mode, manually setting a designated reel rotating speed value by a user, and controlling a driving device by a controller to drive a rotating speed of the reel to reach the designated reel rotating speed value;

under a condition that the control instruction is the automatic speed regulation mode, acquiring an operation running speed and an actual rotating speed; and providing the driving device with a speed regulation signal according to the operation running speed and the actual rotating speed to drive the reel to rotate so as to adjust the crop feed quantity.

8. The method for controlling the reel of the combine harvester according to claim 7, wherein, the providing the driving device with the speed regulation signal according to the operation running speed and the actual rotating speed to drive the reel to rotate so as to adjust the crop feed quantity comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

9. The method for controlling the reel of the combine harvester according to claim 7, wherein the satellite positioning receiver comprises a satellite antenna and a receiver; and wherein the satellite antenna is arranged at a top of the combine harvester, and the receiver is arranged in a cab of the combine harvester.

10. The method for controlling the reel of the combine harvester according to claim 9, wherein the providing the driving device with the speed regulation signal according to the operation running speed and the actual rotating speed to drive the reel to rotate so as to adjust the crop feed quantity comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

11. The method for controlling the reel of the combine harvester according to claim 7, wherein:

the driving device comprises a direct current deceleration motor and a motor driver;

the direct current deceleration motor is connected with the main shaft of the reel, and the direct current deceleration motor is configured to provide the reel with the rotating torque; and the motor driver is connected with the controller to receive the speed regulation signal of the controller to drive the direct current deceleration motor.

12. The method for controlling the reel of the combine harvester according to claim 11, wherein, the providing the driving device with the speed regulation signal according to the operation running speed and the actual rotating speed to drive the reel to rotate so as to adjust the crop feed quantity comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

13. The method for controlling the reel of the combine harvester according to claim 7, the system further comprising a signal processing circuit;

wherein the signal processing circuit is respectively connected with the rotating speed sensor and the controller; and the signal processing circuit is configured to convert the actual rotating speed into a digital signal and transmit the digital signal into the controller.

14. The method for controlling the reel of the combine harvester according to claim 13, wherein, the providing the driving device with the speed regulation signal according to the operation running speed and the actual rotating speed to drive the reel to rotate so as to adjust the crop feed quantity comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

15. The method for controlling the reel of the combine harvester according to claim 7, the system further comprising a touch screen;

wherein the touch screen is connected with the controller to transmit a control instruction to the controller; and the control instruction comprises a manual speed regulation mode and an automatic speed regulation mode.

16. The method for controlling the reel of the combine harvester according to claim 15, wherein, the providing the driving device with the speed regulation signal according to the operation running speed and the actual rotating speed to drive the reel to rotate so as to adjust the crop feed quantity comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

17. The method for controlling the reel of the combine harvester according to claim 15, wherein the touch screen and the controller are both installed in a cab of the combine harvester.

18. The method for controlling the reel of the combine harvester according to claim 17, wherein, the providing the driving device with the speed regulation signal according to the operation running speed and the actual rotating speed to drive the reel to rotate so as to adjust the crop feed quantity comprises:

calculating a target rotating speed of the reel according to the operation running speed;

determining whether the target rotating speed is greater than the actual rotating speed, and generating a first determination result;

under a condition that the first determination result is that the target rotating speed is greater than the actual rotating speed, controlling the driving device to increase the rotating speed of the reel;

under a condition that the first determination result is that the target rotating speed is less than the actual rotating speed, controlling the driving device to reduce the rotating speed of the reel;

under a condition that the first determination result is that the target rotating speed is equal to the actual rotating speed, controlling the reel to keep an original rotating speed.

* * * * *